United States Patent
Cohen et al.

(10) Patent No.: US 8,139,725 B2
(45) Date of Patent: *Mar. 20, 2012

(54) ASSOCIATED INFORMATION IN STRUCTURED VOICE INTERACTION SYSTEMS

(75) Inventors: Alexander J. Cohen, Mill Valley, CA (US); Robert W. Lord, Seattle, WA (US); John D. Rinaldo, Jr., Bellevue, WA (US); Mark A. Malamud, Seattle, WA (US); Royce A. Levien, Lexington, MA (US); Edward K. Y. Jung, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1321 days.

This patent is subject to a terminal disclaimer.

(21) Appl. No.: 11/112,837

(22) Filed: Apr. 22, 2005

(65) Prior Publication Data

US 2007/0019794 A1    Jan. 25, 2007

(51) Int. Cl.
*H04M 11/00* (2006.01)

(52) U.S. Cl. .................. 379/88.14; 370/352; 379/88.17; 379/88.18; 379/88.23; 379/93.09; 379/93.12; 455/414.4; 704/270; 709/203; 709/218; 709/219; 709/228; 709/229; 715/717; 715/720; 715/738; 715/747

(58) Field of Classification Search .......... 370/351–356, 370/259–271; 379/67.1–88.28, 92.01–93.01, 379/93.09, 93.12, 93.13, 93.23–93.31, 100.01, 379/101.01–102.03, 201.01, 265.01–266.1; 455/412.2, 414.1, 414.4, 457, 468; 709/201–207, 709/217–244; 715/716–718; 348/14.01–14.16; 704/270.01–278

See application file for complete search history.

(56) References Cited

U.S. PATENT DOCUMENTS

| | | | |
|---|---|---|---|
| 5,420,975 A | | 5/1995 | Blades et al. |
| 5,802,526 A | * | 9/1998 | Fawcett et al. ......................... 1/1 |
| 5,832,065 A | * | 11/1998 | Bannister et al. .......... 379/93.08 |
| 5,859,628 A | | 1/1999 | Ross et al. |
| 5,937,040 A | | 8/1999 | Wrede et al. |
| 5,945,985 A | * | 8/1999 | Babin et al. .................... 715/209 |
| 6,016,336 A | | 1/2000 | Hanson |
| 6,018,711 A | * | 1/2000 | French-St. George et al. ............................. 704/275 |
| 6,324,507 B1 | | 11/2001 | Lewis et al. |
| 6,418,199 B1 | * | 7/2002 | Perrone ...................... 379/88.01 |

(Continued)

FOREIGN PATENT DOCUMENTS

EP     1109384 A2    12/1999

OTHER PUBLICATIONS

Lai et al.; "Speech Trumps Finger: Examining Modality Usage in a Mobile 3G Environment"; IBM Research Report; bearing a date of Oct. 1, 2004; pp. 1-11.

*Primary Examiner* — Hemant Patel

(57) ABSTRACT

A structured voice interaction system includes logic to communicate one or more voice prompts to a caller via a voice channel, and to communicate navigation information for the structured voice interaction system to the caller via a data channel. Voice prompts communicated to the caller via the voice channel connection are coordinated with the navigation information communicated via the data channel connection. Information not referenced by the voice channel prompts, but related to or associated with actions or options referenced by the voice channel prompts, is accessed, identified, and provided over the data channel connection.

22 Claims, 5 Drawing Sheets

U.S. PATENT DOCUMENTS

| | | | |
|---|---|---|---|
| 6,456,699 B1 * | 9/2002 | Burg et al. | 379/88.17 |
| 6,504,917 B1 * | 1/2003 | Flint et al. | 379/93.01 |
| 6,745,163 B1 * | 6/2004 | Brocious et al. | 704/260 |
| 6,788,770 B1 * | 9/2004 | Cook et al. | 379/100.01 |
| 6,885,737 B1 | 4/2005 | Gao et al. | |
| 6,920,425 B1 | 7/2005 | Will et al. | |
| 7,027,990 B2 | 4/2006 | Sussman | |
| 7,054,939 B2 * | 5/2006 | Koch et al. | 709/227 |
| 7,080,315 B1 * | 7/2006 | Lucas et al. | 715/201 |
| 7,092,370 B2 * | 8/2006 | Jiang et al. | 370/329 |
| 7,092,738 B2 * | 8/2006 | Creamer et al. | 455/563 |
| 7,133,899 B2 | 11/2006 | Rowe | |
| 7,136,478 B1 * | 11/2006 | Brand et al. | 379/265.09 |
| 7,142,661 B2 * | 11/2006 | Erhart et al. | 379/265.09 |
| 7,162,414 B2 | 1/2007 | Stanford | |
| 7,224,999 B1 * | 5/2007 | Yamaguchi | 455/566 |
| 7,398,215 B2 | 7/2008 | Mesbah et al. | |
| 7,492,883 B2 | 2/2009 | Kumhyr | |
| 7,924,985 B2 * | 4/2011 | Rinaldo et al. | 379/88.14 |
| 2001/0015972 A1 * | 8/2001 | Horiguchi et al. | 370/352 |
| 2001/0029425 A1 * | 10/2001 | Myr | 701/200 |
| 2002/0013728 A1 * | 1/2002 | Wilkman | 705/14 |
| 2003/0005076 A1 * | 1/2003 | Koch et al. | 709/217 |
| 2003/0018700 A1 * | 1/2003 | Giroti et al. | 709/201 |
| 2003/0084188 A1 | 5/2003 | Dreyer et al. | |
| 2003/0112931 A1 * | 6/2003 | Brown et al. | 379/93.23 |
| 2003/0162561 A1 * | 8/2003 | Johnson et al. | 455/553 |
| 2003/0182366 A1 * | 9/2003 | Baker et al. | 709/203 |
| 2004/0053605 A1 | 3/2004 | Martyn et al. | |
| 2004/0122941 A1 | 6/2004 | Creamer et al. | |
| 2004/0240640 A1 | 12/2004 | Warner et al. | |
| 2004/0248513 A1 | 12/2004 | Glass et al. | |
| 2005/0031092 A1 * | 2/2005 | Umemura et al. | 379/88.13 |
| 2005/0135598 A1 | 6/2005 | Badt, Jr. et al. | |
| 2005/0172232 A1 | 8/2005 | Wiseman | |
| 2005/0207545 A1 * | 9/2005 | Gao et al. | 379/88.17 |
| 2005/0266798 A1 | 12/2005 | Moloney et al. | |
| 2006/0088145 A1 * | 4/2006 | Reed et al. | 379/88.19 |
| 2006/0101005 A1 * | 5/2006 | Yang et al. | 707/3 |
| 2006/0217885 A1 * | 9/2006 | Crady et al. | 701/213 |
| 2006/0239422 A1 * | 10/2006 | Rinaldo et al. | 379/88.16 |

* cited by examiner

ASSOCIATED INFORMATION IN STRUCTURED VOICE INTERACTION SYSTEMS

TECHNICAL FIELD

The present disclosure relates to structured voice interaction systems.

BACKGROUND

Structured voice interaction systems (systems that include structured audio prompts to which responses may be made either using voice or using one or more non-voice techniques) are a common feature in today's communication environments. People often interact with such systems to access information via the telephone or telephony-enabled devices. Structured voice interaction systems typically offer choices in the form of voice prompts, to which the caller responds by providing voice responses, and/or key presses that produce tones. Responding to one set of prompts may result in the system providing the caller with another set of prompts. In other words, the voice interaction system may be hierarchical (e.g. comprise levels of choices, inter alia, menus) and structured.

Systems with many levels may leave callers frustrated and/or confused, due to a bewildering variety of selections distributed over many levels. The audio menus presented by such systems are limiting as they are only able to present a small number of choices and a narrow range of relationships among entities. Another element contributing to frustration is that, even after several uses, much of the functionality provided by the system may remain unknown. This occurs with such systems because the only way to find out about the options associated with any selection is to choose that selection.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A voice channel connection and a data channel connection are established with a structured voice interaction system. Navigation information for and provided by the structured voice interaction system in received over the data channel connection. The data channel navigation information is coordinated with navigation information provided by the structured voice interaction system over the voice channel connection.

A structured voice interaction system includes logic to communicate one or more voice prompts to a caller via a voice channel, and to communicate navigation information for the structured voice interaction system to the caller via a data channel. Voice prompts communicated to the caller via the voice channel connection are coordinated with the navigation information communicated via the data channel connection. Information not referenced by the voice channel prompts, but related to or associated with actions or options referenced by the voice channel prompts, is accessed, identified, and provided over the data channel connection.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

"Logic" refers to signals and/or information that may be applied to effect the operation of a device. Software, hardware, and firmware are examples of logic. Hardware logic may be embodied in circuits. In general, logic may comprise combinations of software, hardware, and/or firmware.

Figure 1:
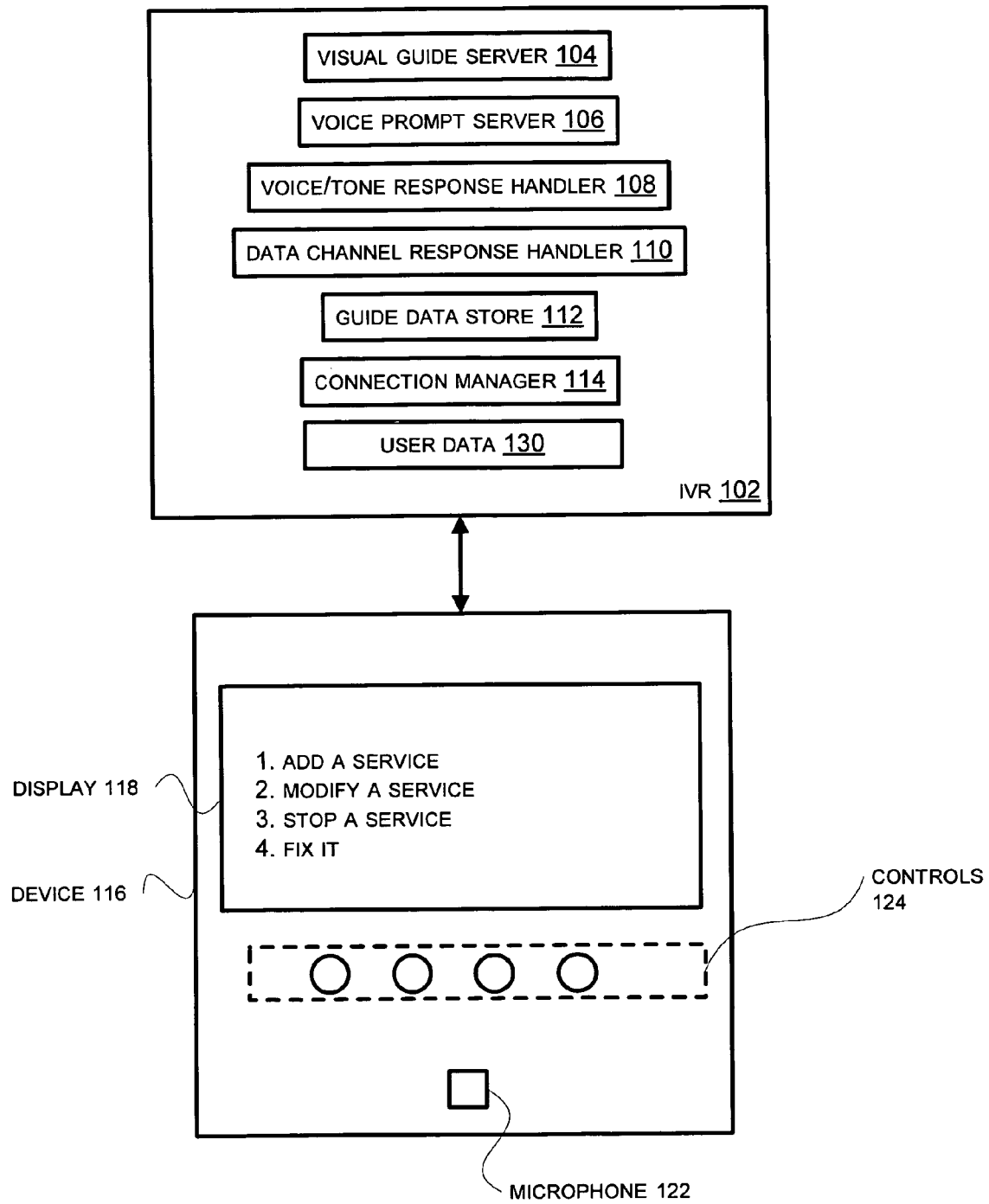
FIG. 1 shows a block diagram of an embodiment of a structured voice interaction system.

FIG. 1 shows a block diagram of an embodiment of a structured voice interaction system. A caller, a.k.a. user or customer, may interact with the system using a device 116. The device 116 comprises a display 118, a microphone 122, and controls 124. The display 118 contents ("1. ADD A SERVICE"..etc.) are indicative of what might be presented on the display.

A voice channel connection may be established between a user and a structured voice interaction system 102, e.g. and a structured voice interaction system (e.g., Voice-in-Voice-out (VIVO) system and/or an interactive voice interaction system (SVIS) and/or or an audio input system. Examples of a voice channel connection are plain old telephone service connections, a wireless connection (e.g., a cellular telephone voice channel connection), or a voice-over-IP connection.

Often, the structured voice interaction system 102 is a commercial interactive voice interaction system, such as those employed by call centers, consumer information services, directory services, help lines, technical support lines, gaming services, information sources, and customer service centers. However, the structured voice interaction system 102 may also be implemented using personal computers, laptop computers, hand-held devices, telephones, gaming devices, telephone answering devices, message recording devices, switchboard devices, or voice mail systems, to name just some of the possibilities.

Examples of telephones that may be used in such environments include, but are not limited to, cell phones, wireless handsets, display phones, personal digital assistants, and various types of computers with telephony capability.

As shown in FIG. 1, the structured voice interaction system (SVIS) 102 comprises a voice prompt server 106, a voice/tone response handler 108, a connection manager 114, and user data 130. The SVIS 102 also comprises a guide server 104, a data channel response handler 110, and a guide data store 112. Those skilled in the art will appreciate that, with respect to the guide server 104, in some implementations a visual guide is served up, while in other implementations the served up information is substantially structural information which is ultimately visually presented through device 116.

In other embodiments, some of the elements shown in FIG. 1 as comprising the SVIS 102 may exist separately from the SVIS 102. For example, a guide server 104, and/or a guide data store 112 may exist in a system which may be considered to be distinct physically and/or logically from the SVIS 102 but cooperate with the SVIS 102 to accomplish techniques described herein.

A data channel connection may be established between the user device 116 and the SVIS 102. The data channel connection may be established before, almost at the same time, or after the voice channel connection is established. The connection manager 114 may operate to establish and control connections.

The data channel connection user device 116 may be the same as the voice channel connection device (also 116). Or, the data channel connection user device 116 may be a different device from the voice channel device (not shown).

Some examples of a data channel connection are connections supporting Internet Protocol (IP), Hypertext Transfer Protocol (HTTP), and/or Transmission Control Protocol/Internet Protocol (TCP/IP). A data channel connection may comprise a cell phone data channel connection such as a short message service (SMS) connection, an enhanced message service (EMS) connection, or a multimedia message service (MMS) connection. The guide data store 112 may act as a repository for navigation information. The guide server 104 may operate to provide to callers navigation information of the guide data store 112. The guide information may represent information that may be presented visually to the user.

The user device 116 may receive, over the data channel connection, navigation information for the SVIS 102 provided by the SVIS 102. The navigation information provided by the SVIS 102 over the data channel may be coordinated with navigation information (e.g. voice prompts) provided by the SVIS 102 over the voice channel. The SVIS 102 may include logic (e.g. voice prompt server 106) to communicate one or more voice prompts to a caller via a voice channel, and to communicate corresponding navigation information (e.g. guide server 104) for the SVIS 102 to the caller via a data channel.

The navigation information provided by the SVIS 102 over the data channel may comprise one or more maps, trees, indexes, or other representations of available actions at different levels. Although the term "navigation information" is employed, the information made available by the SVIS 102 need not all apply to navigation, and may result in other actions, or may be purely informational elements such as phone numbers, instructions, etc.

In one implementation, navigation information provided entails all or part of a logical description of the navigational information appropriate to the current voice prompt context, which, in addition to a representation of the current navigational context, may include extensive information that 110 determines is relevant to that context. In some implementations, the referred to "extensive information" may include, for example, links to other voice menus, the entire voice menu structure, the structure of a menu of all the features provided by the source of SVIS 102 of which the SVIS 102 may only be a part (e.g., the voice menu is customer service menu, but the information over data channel is structure of customer service, directions, marketing, etc.)

Each level of an SVIS 102 may be considered to include a set of prompts and a set of permitted responses (e.g. navigation commands) to those prompts. The first or main level of the SVIS 102 comprises the prompts provided when, for example, a caller enters the system by calling its entry phone number. Providing one of the corresponding responses may result in the SVIS 102 providing prompts and permitted responses for a next, lower level. Each level may represent a state of the SVIS. The current level of the SVIS 102 is a current state of the SVIS 102; this is the level for which prompts are currently presented via the voice channel connection.

The navigation information provided via the data channel may take various forms. For example, the navigation information may be text corresponding to or representing voice prompts at the various levels. The navigation information may be, among other things, an extensible markup language representation, hypertext markup language representation, static image or set of images, and/or icons. The navigation information provided may determine the content of all or only part of the device display 118 in a cooperative, e.g. synchronized, fashion with communication of audio navigation information (e.g. voice prompts).

Navigation information for the SVIS 102 may be provided for levels of the SVIS 102 other than or in addition to a current level of the SVIS 102. For example, navigation information may be provided for the level of the SVIS 102 that results from providing the one or more navigation commands, and for one or more sublevels of that level.

Navigation commands (e.g. information to the SVIS 102 about which actions to take) may be provided over either or both of the voice or data channels. Voice commands may be provided via the microphone 122. In general, the controls 124 may be involved in providing voice and/or data channel commands and in general operation of the device 116. At the SVIS 102, the voice/tone response handler 108 may operate to receive and process voice channel navigation commands; the data channel response handler 110 may operate to receive and process data channel navigation commands.

The SVIS 102 may include logic to communicate at least one of text, one or more images, one or more icons, hypertext markup language information, or extensible markup language information to the caller via the data channel connection. The SVIS 102 logic may operate to communicate navigation information to the caller via at least one of a short message service connection, an enhanced message service connection, or a multimedia message service connection.

The SVIS 102 may comprise logic to coordinate the one or more voice prompts communicated to the caller via the voice channel connection with the navigation information communicated via the data channel connection. Such logic may include logic to provide navigation information for a level of the SVIS 102 for which voice prompts presently apply, and/or logic to provide to the caller navigation information for a present level and at least one sublevel of the present level of the SVIS 102, and/or logic to adapt the one or more voice prompts communicated to the caller via the voice channel connection and the navigation information communicated to the caller via the data channel connection according to one or more navigation commands received from the caller via either or both of the voice and data channels. The navigation information communicated to the caller may reflect a level of the SVIS 102 that results from the one or more navigation commands received from the caller.

The SVIS 102 may comprise logic to exchange navigation information and commands via the data channel connection, the navigation information coordinated with voice prompts and one or more navigation commands exchanged via the voice channel connection. For example, the SVIS 102 may include logic to receive and process at least one of spoken words or touch tones via the voice channel connection, and/or one or more navigation commands via the data channel connection, and to provide appropriate voice prompts and navigation information in response.

In some embodiments, navigation information for the SVIS 102 may not be contained within the SVIS 102, e.g. the guide data store 112 may be part of another device or system. In one such embodiment, the SVIS 102 may interact with a separate navigation information source to receive the appropriate navigation information and the SVIS 102 may use the data channel to communicate the navigation information to the device 116. Examples of such separate sources for the navigation information include a web server, an internet service provider, or a network gateway.

In another embodiment, the SVIS 102 may perform actions which cause the source of the navigation information to communicate the navigation information directly (e.g. without substantial involvement of the SVIS 102) to the device 116 using the data channel. Even when the navigation information is from a different source than the SVIS 102, the SVIS 102 may even so comprise logic to coordinate voice prompts and overall state with the navigation information.

The SVIS 102 shown in FIG. 1 supports both a voice channel and a data channel and may use one or both as circumstances dictate. In other words, the SVIS may act as a traditional or typical SVIS system providing only voice channel access for callers limited in that manner.

The calling device 116 and/or SVIS 102 may comprise logic to authenticate a caller. Authentication may involve comparison of device and/or user information provided from the calling device 116 and compared with stored user data 130. For example, a device identifier such as an International Mobile Subscriber Identity, and optionally a corresponding password, may be provided by the device 116 to the SVIS 102 and compared with stored user data 130. The device 116 and/or a user thereof may be thus authenticated to the SVIS 102.

Figure 2:
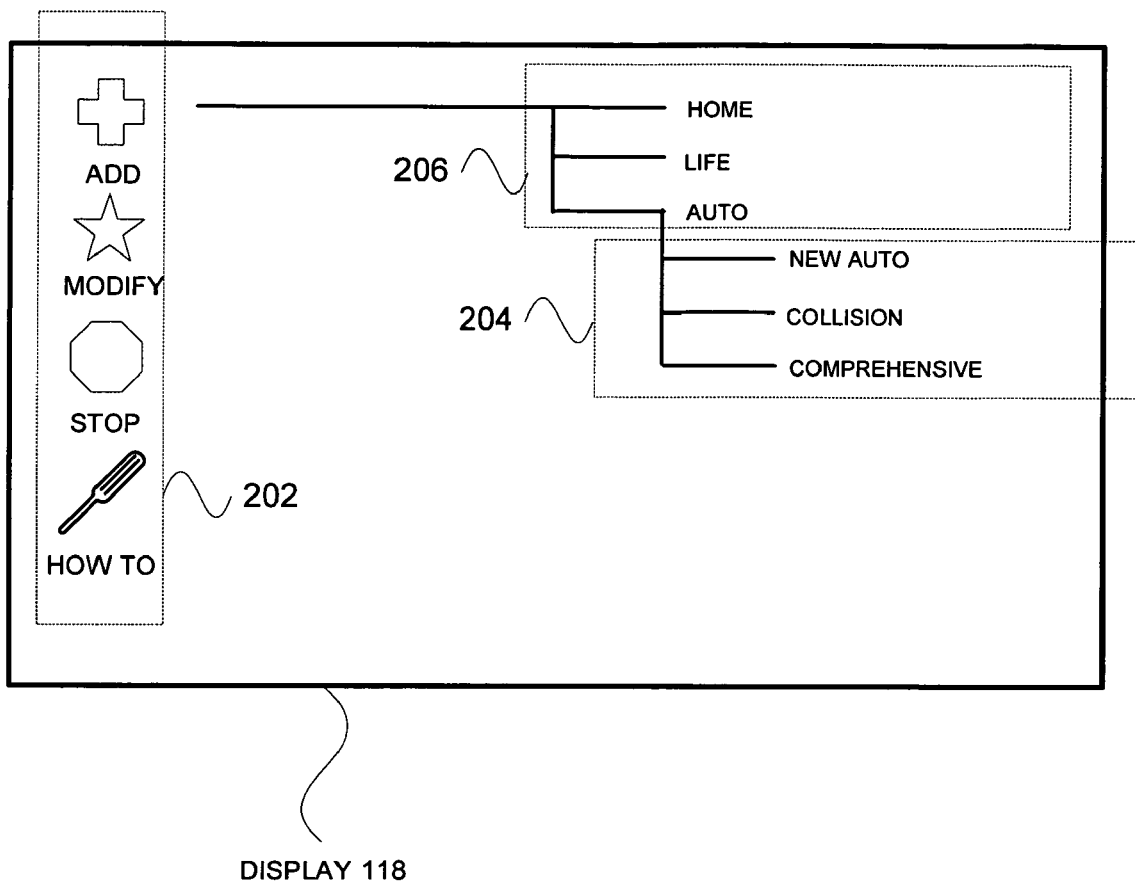
FIG. 2 shows a block diagram of an embodiment of a visual representation of structured voice interaction system navigation information.

FIG. 2 shows a block diagram of an embodiment of a visual representation of some navigation information for a structured voice interaction system.

A main level 202 of the system provides general actions of "ADD", "MODIFY", "STOP", and "HOW TO". These options are represented by icons and associated text. Extending the example to a structured voice interaction system for insurance policies and claims, the main choices may correspond to options for adding coverage or policies, modifying existing policies, stopping coverage, or general questions on how to do any of the above. A second level 206 set of choices under "ADD" includes options for adding "home", "life", or "auto" coverage. A third level 204 under "auto" includes choices for "new auto" (e.g. add an automobile to a policy), "collision" (add collision coverage to an auto policy), or "comprehensive" (add comprehensive coverage to an auto policy).

Although this example shows navigation information presented on a display 118, other presentation options are possible, including options involving audible presentation.

Presented representations of navigation information may correspond to stored representations of navigation commands. In response to a selection by the user from the presented representations, a corresponding stored representation may be selected and communicated over the data or voice channel to produce one or more navigation commands as received by the SVIS 102. Producing the navigation commands may involve producing data channel protocol information, producing voice responses, or producing tones, to name a few examples. Navigation commands may also be provided as spoken words via the voice channel connection or one or more touch tones via the voice channel connection. Spoken words may result from reading words of the presented navigation information, e.g. speaking "add home" into the microphone 122. The SVIS may comprise logic to recognize one or more navigation commands received via the voice channel connection as spoken words corresponding to the navigation information.

A user of the device 116 may make selections from the presented navigation information in various ways, for example via touch screen selection, a spoken selection, or selection via one or more telephone controls 124.

The user may make a selection by providing a "shortcut" to selections one or more levels removed from a current level of the SVIS. For example for the navigation information visualized in part in FIG. 2, the action "Request Insurance Account Statement" could correspond to providing the following tone responses to the SVIS via conventional utilization the voice channel connection; #4,#1,#3,#6, where '#' indicates a tone key. However, a shortcut could be defined such as "Account Statement" that, when spoken or selected, would achieve similar results without the undue burden or remembering obscure key press sequences. Shortcut navigation information can include spoken words, text, one or more images, one or more icons, hypertext markup language information, or extensible markup language information, to name a few examples.

Shortcuts, applied to the SVIS, may result in bypassing at least one level of the SVIS. Bypassing at least one level of the SVIS, from the perspective of the user, means initiating an action of a level at least one removed from the current SVIS level. Either the voice or the data channel, or both, may be used when communicating navigation commands, shortcuts, and SVIS responses in the form of voice prompts and navigation information. The SVIS may comprise logic to recognize one or more navigation commands received via the voice or data channel as spoken words, tones, data channel commands, or a combination thereof corresponding to shortcuts of the structured voice interaction system.

Figure 3:
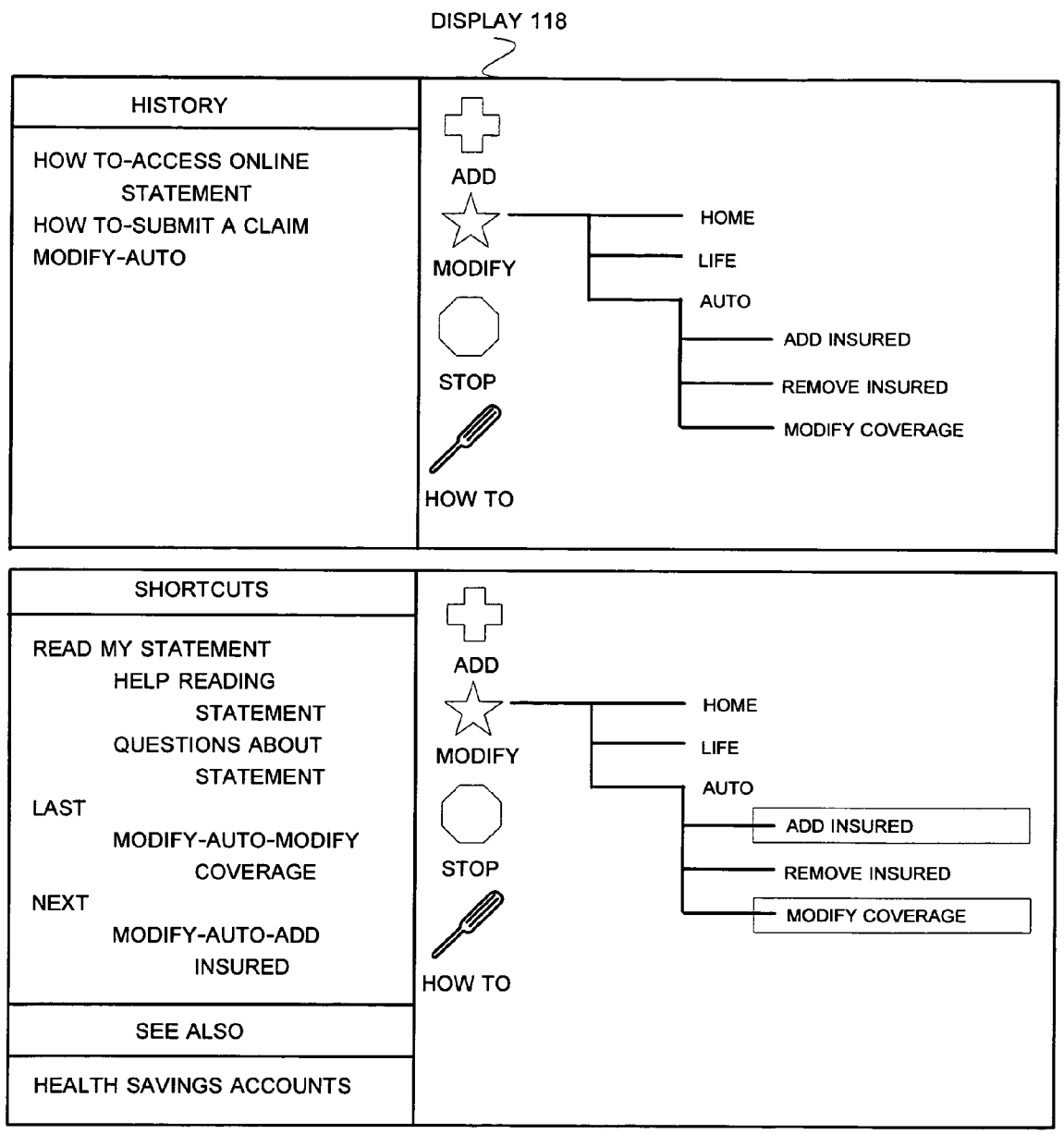
FIG. 3 shows a block diagram of an embodiment of a navigation history, shortcuts, associations, and related items.

FIG. 3 shows a block diagram of an embodiment of navigation history, shortcuts, associations, and related items. The SVIS 102, or a calling device 116 such as a telephone, may store representations of the one or more navigation commands provided from the telephone to the SVIS 102. Examples of such stored representations include one or more of a caller-assigned name, label, icon, or image, recorded caller voice responses to the structured voice interaction system, or representations thereof, and data channel connection navigation signals, or representations thereof.

Possible types of stored representations include representations of navigation command history, shortcuts, relative navigation commands, and representations for commands related to a particular SVIS level and/or context.

The stored navigation information may include a stored navigation history for the caller, e.g. records of previous interactions of this caller and/or device 116 with the SVIS 102. The stored navigation history may be stored by the calling device 116, or provided by the SVIS 102 upon authentication of the calling device 116 and/or caller. In other words, in some cases, upon authentication of the calling device 116 and/or caller, the calling device 116 may receive from the SVIS 102 and present representations of navigation commands that have been previously applied to the SVIS 102 by the calling device 116 and/or caller.

The calling device 116 may include logic to enable the presentation and selection of visual representations of stored representations of navigation commands. These representations may be stored by the calling device 116, or stored by the SVIS 102 and provided to the calling device 116, possibly after appropriate authentication.

The representations of navigation commands may include representations of one or more relative navigation actions from a particular level and/or state of the SVIS 102, or absolute navigation actions that can be applied with consistent results from any state of the SVIS 102. One example of a relative navigation command is the last navigation command taken overall, or from a particular level of the SVIS 102. Another example of a relative navigation command is the next navigation command taken previously in a similar context. As shown in FIG. 3, various aspects of the navigation history, such as the next command taken (ADD INSURED), or last command taken (MODIFY COVERAGE), may be highlighted or otherwise distinguished on the display.

The representations of the navigation commands may include indications that the navigation commands are those most recently used overall, or most recently used in a particular context (e.g. at a particular level of the SVIS 102). The representations may be organized according to the SVIS to which they apply. Thus, the stored representations of navigation commands may include an associated indication of the SVIS to which they apply. The stored representations of navigation commands may be organized according to task, topic, or goal. The representations may be organized or identified by the role, title, function, purpose, or position of a person or persons with whom the navigation commands, when applied to the SVIS 102, result in contact. The representations may be organized or identified according to a service, department, organization, office, or operation with which contact results from application of the represented navigation commands.

Indications may be provided of actions and/or selections that are related to a particular SVIS level and/or context. In FIG. 3, such related selections are identified under the heading "See Also". Thus, for example, a topic such as Health Savings Accounts, which may or may not correspond to a selection available via the menus of the SVIS 102, may be provided if related to a current level, context, history, or other aspect of the navigation of the SVIS 102.

Figure 4:
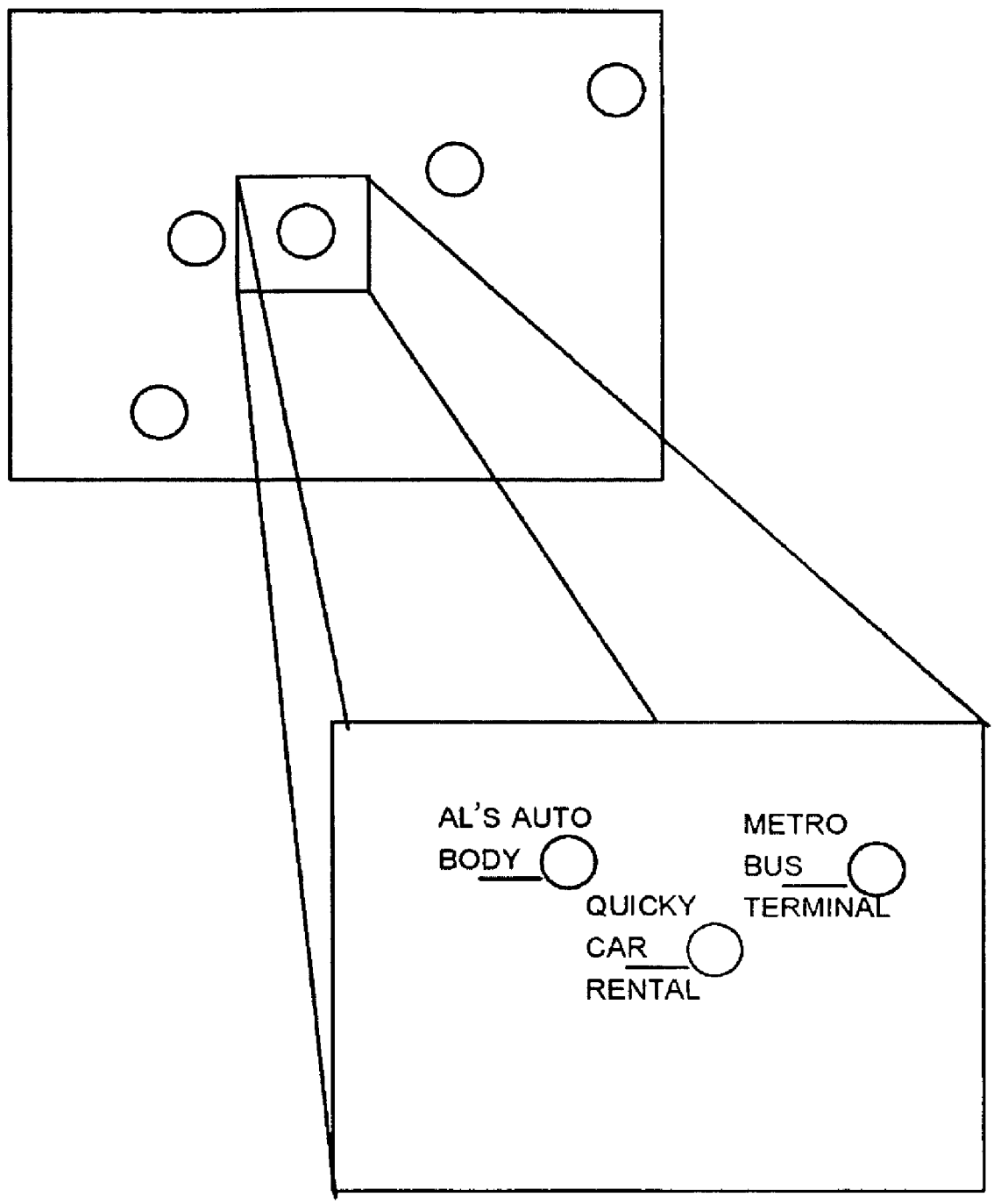
FIG. 4 shows an illustration of an embodiment of hierarchical navigation maps with related information.

FIG. 4 shows an illustration of an embodiment of hierarchical navigation maps with related information. A map of a portion of a geographic area titled "Redmond" is shown, and a portion of that displayed geographic area is also presented, with the scale refined so that more detailed information about that smaller portion is presented.

The illustration of FIG. 4 is an example of the SVIS 102 providing, via the data channel connection, navigation information comprising at least one geographic map and geographic map location information for one or more of people, places, products, services, or activities referenced by SVIS voice channel prompts. Examples of geographic map location information include at least one of an address, latitude-longitude information, or map coordinates.

The maps may represent, for example, a city, state, town, neighborhood, downtown area, or geographic area surrounding or proximate to a location of the caller.

In embodiments where maps are employed, the SVIS 102 may also provide, in conjunction with the maps, information for actions or options not referenced by voice channel prompts of the structured voice navigation system, but related to or associated with actions or options referenced by the voice channel prompts. The related information may reference actions/selections for which there is no corresponding voice information available via the SVIS 102. Extending the insurance system example, a user may select to identify a repair location in a particular zip code corresponding to the "Redmond" area. A first map is provided showing circles identifying locations of repair locations in the area. Other types of indications for geographic map location information include icons, annotations, highlights, and various shapes.

Other actions or options not referenced by voice channel prompts of the structured voice navigation system, but related to or associated with actions or options referenced by the voice channel prompts include actions to purchase a product and/or service, download a file, access an online file, resource, or service, save associated information, or open a web page.

The user of the calling device 116 may zoom in on a geographic area of the map, for example by touching the display 118 with a stylus on a particular map location. A subsequent map is provided by the SVIS 102 showing the repair location in the selected area (Al's Auto Body) and the locations of related services, products, activities, and so on. In this example, the related services are a car rental outlet and a bus terminal. These are services deemed likely of interest to a person taking their car in for repair, because alternative means of transportation may be needed away from the area.

Other examples of services, products, or activities related to selections available via the SVIS 102 include the location of ATMs or gas stations.

In some cases, lower levels of the structured voice interaction system may have corresponding geographic information for a smaller area than navigation information received for higher levels. For example, an SVIS system for locating movies and show times may have higher-level maps encompassing an entire city, whereas lower-level maps may encompass a single neighborhood comprising one or a few movie theaters.

Another example of hierarchical information that may be provided by the SVIS 102 via the data channel includes organization charts and organization chart location information for one or more of people, departments, groups, teams, offices, services, or activities referenced by voice channel prompts of the structured voice interaction system, or related to or associated with material referenced therein.

The SVIS 102 may provide navigation information for at least one of people, products, services, actions, or activities related to or associated with one or more stored attributes or preferences of the caller. The caller attributes/preferences may be stored by the SVIS 102 (e.g. the user data 130), or by the calling device 116. When stored by the calling device 116, the attributes/preferences may be provided to the SVIS 102 via the data channel connection, enabling the SVIS 102 to identify related to or associated with such attributes/preferences. Thus, in some cases the SVIS 102 may include logic to identify and access attributes and/or preferences of a caller, possibly in response to authentication of the caller and/or calling device 116. In other cases, the attributes and/or preferences of the caller may be communicated to the SVIS 102 from the calling device 116.

Logic of the calling device 116 and/or SVIS 102 may operate to update one or more stored preferences and/or attributes of the caller according to one or more navigation commands received from the caller. In other words, caller preferences and/or attributes may evolve according to the navigation history of the caller.

The SVIS may comprise logic to identify and access information not referenced by the voice channel prompts, but related to or associated with actions or options referenced by the voice channel prompts, and to provide over the data channel connection navigation information for the information related to or associated with actions or options referenced by the voice channel prompts or data channel navigation information. The related or associated information may come from a source other than the SVIS 102, such as a third party service provider.

In general, the related or associated information may come from a source associated with but distinct from the structured voice interaction system, such a source not co-located with the structured voice interaction system (e.g. another department of the same organization, another office, an affiliate, and so on).

Actions and/or options available via a third party (and/or via a source associated with but distinct from the structured voice interaction system) include products, services, people, actions, orders, etc available from a person, organization, or entity that is not the caller or the person, organization, or entity providing the SVIS 102. Other potential related or associated actions or services include downloading a file, accessing an online file, resource, or service, saving navigation information or information provided in conjunction therewith, or opening a web page.

The SVIS may comprise logic to identify, access, and coordinate the presentation of information provided by other information sources such as third parties with the structure and capabilities of the SVIS system, such as its options, levels, and menus.

The calling device 116 may provide navigation commands to the structured voice interaction system and/or third party provider over either or both of the voice or data channels, the navigation commands representing selections of the related and/or associated actions or options. The SVIS 102 may in some circumstances act to coordinate the communication of these navigation commands, selections, etc. to the third party. In other circumstances, communication between the third party provider and the calling device 116 may occur more directly.

Figure 5:
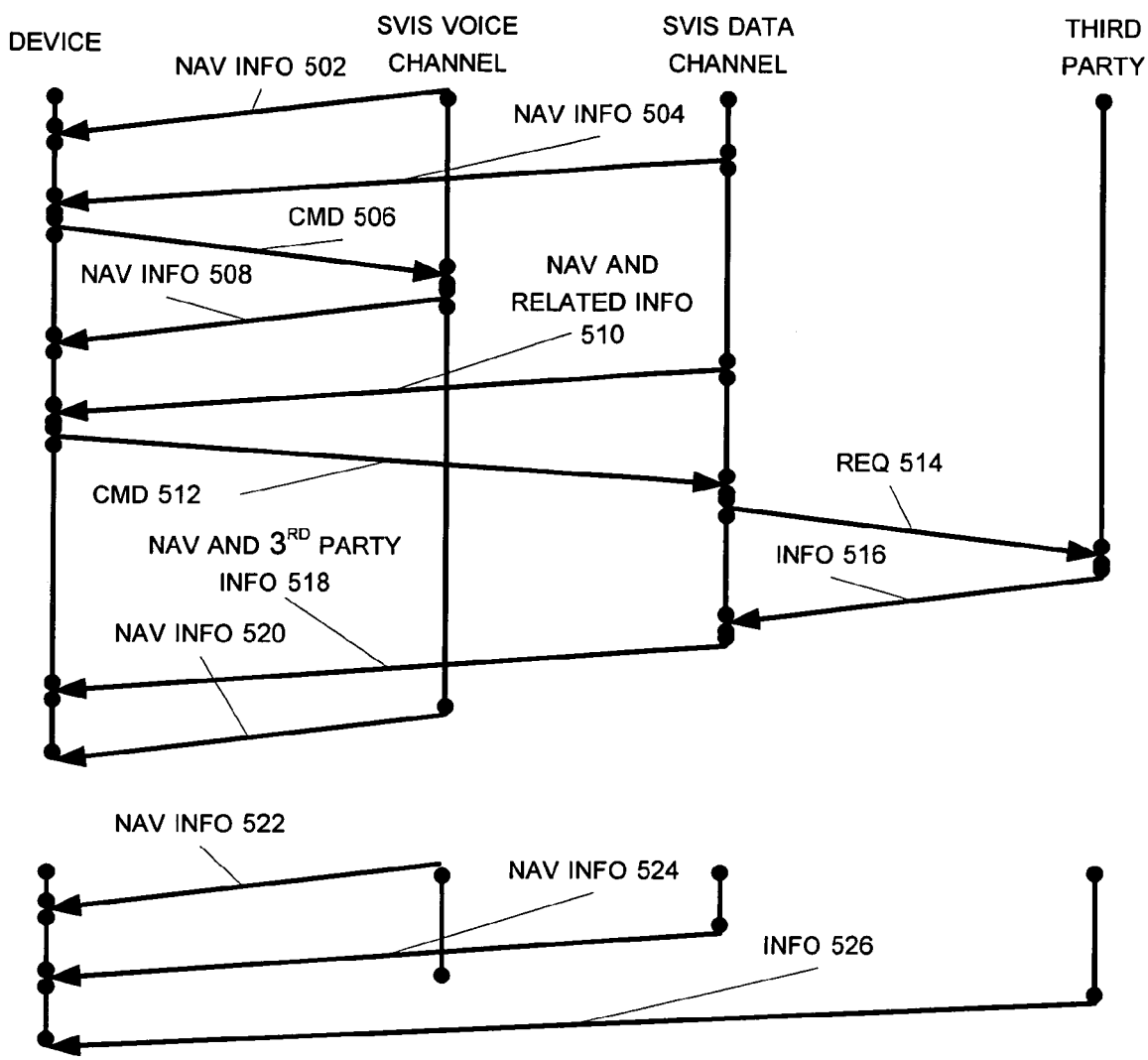
FIG. 5 shows an action flow diagram showing communication among various elements of an embodiment of a structured voice interaction system.

FIG. 5 shows an action flow diagram showing communication among various elements of an embodiment of a structured voice interaction system.

At 502 navigation information (which need not all apply to navigation) is provided via the SVIS voice channel to a device, such as a telephone device. At 504 navigation information is provided via the data channel of the SVIS, in a coordinated (e.g. synchronized) fashion along with the navigation information of the voice channel. A command is provided at 506 from the device to the SVIS, in this case via the voice channel (e.g. a spoken command or touch tone). The command could also be provided via the data channel. As a result of the command, the system changes levels, and new or additional navigation information is provided at 508 and 510 via the voice and data channels. In addition, at 510, information related to the navigation information is provided from the SVIS to the device via the data channel. Such related information could also be provided via the voice channel.

A 512 a command is provided from the device to the SVIS via the data channel. In response, the system may change levels, resulting in communication of new information to the device via the voice and/or data channels. At 514 the SVIS requests from a third party information related to this new information that will be provided to the device. The related information is provided by the third party to the SVIS at 516. The new information and related third party information is communicated to the device at 518, as is new voice channel information at 520.

As 522-526 demonstrate, the navigation information provided by the SVIS, and the third party information, may be provided separately. For example, the third party may provide the third party information to the device without first providing the information to the SVIS. The coordination/synchronization of the third party information and navigation information may occur at the device.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. The words "herein," "above," "below" and words of similar import, when used herein, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:
    establishing using at least one calling device one or more connections with at least one remote structured voice interaction system; and
    receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option.

2. A system comprising:
    circuitry configured for establishing using at least one calling device one or more connections with at least one remote structured voice interaction system; and
    circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option.

3. The system of claim 2, wherein the circuitry configured for establishing using at least one calling device one or more connections with at least one remote structured voice interaction system comprises:
    circuitry configured for establishing using at least one phone one or more connections with at least one remote structured voice interaction system.

4. The system of claim 2, wherein the circuitry configured for establishing using at least one calling device one or more connections with at least one remote structured voice interaction system comprises:
    circuitry configured for establishing using at least one computer one or more connections with at least one remote structured voice interaction system.

5. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:
    circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of map information.

6. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:

circuitry configured for receiving (i) at least one audible representation of at least one first option of the at least one remote structured voice interaction system, (ii) at least one visual shortcut to at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option.

7. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:

circuitry configured for receiving (i) at least one audible representation of at least one first option of the at least one remote structured voice interaction system, (ii) at least one visual representation of at least one second option and at least one other visual representation of at least one other option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option.

8. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:

circuitry configured for receiving (i) at least one audible representation of at least one first option of the at least one remote structured voice interaction system, (ii) at least one visual representation of at least one second option and at least one visual representation of the at least one first option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option.

9. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:

circuitry configured for receiving from one or more sources other than the at least one remote structured voice interaction system (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option.

10. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:

circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, (iii) at least one visual representation of supplemental reference information that is different from the at least one first option and the at least one second option, and (iv) at least one previous command.

11. The system of claim 2, further comprising:
circuitry configured for transmitting one or more commands.

12. The system of claim 2, wherein the circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one visual representation of supplemental reference information that is different from the at least one first option and the at least one second option comprises:
  circuitry configured for receiving (i) at least one audible representation of at least one first option of the at least one remote structured voice interaction system, (ii) at least one visual representation of at least one second option of the at least one remote structured voice interaction system for visual output concurrently with audible output of the at least one audible representation of the at least one first option of the at least one remote structured voice interaction system, the at least one second option hierarchically at least two levels removed from the at least one first option, and (iii) at least one link associated with at least one product or service.

13. A method comprising:
establishing one or more connections with at least one remote calling device; and
transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option.

14. A system comprising:
circuitry configured for establishing one or more connections with at least one remote calling device; and
circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option.

15. The system of claim 14, wherein the circuitry configured for establishing one or more connections with at least one remote calling device comprises:
  circuitry configured for establishing one or more connections with at least one remote phone.

16. The system of claim 14, wherein the circuitry configured for establishing one or more connections with at least one remote calling device comprises:
  circuitry configured for establishing one or more connections with at least one remote computer.

17. The system of claim 14, wherein the circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option comprises:
  circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of map information.

18. The system of claim 14, wherein the circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option comprises:
  circuitry configured for transmitting (i) at least one audible representation of at least one first option of at least one structured voice interaction system, (ii) at least one visual representation of the at least one first option of the at least one structured voice interaction system and at least one visual shortcut to at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option.

19. The system of claim 14, wherein the circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option comprises:

circuitry configured for transmitting (i) at least one audible representation of at least one first option of at least one structured voice interaction system, (ii) at least one visual representation of the at least one first option, at least one visual representation of at least one second option, and at least one other visual representation of at least one other option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option.

20. The system of claim 14, wherein the circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option comprises:

circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, (iii) at least one visual representation of supplemental reference information that is different from the at least one first option and the at least one second option, and (iv) at least one previous command.

21. The system of claim 14, wherein the circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one visual representation of supplemental reference information that is different from the at least one first option and the at least one second option comprises:

circuitry configured for transmitting (i) at least one audible representation of at least one first option of at least one structured voice interaction system, (ii) at least one visual representation of the at least one first option of the at least one structured voice interaction system and at least one visual representation of at least one second option of the at least one structured voice interaction system for visual output concurrently with audible output of the at least one audible representation of the at least one first option of the at least one structured voice interaction system, the at least one second option hierarchically at least two levels removed from the at least one first option, and (iii) at least one link associated with at least one product or service.

22. The system of claim 14, further comprising:
circuitry configured for receiving one or more commands.

\* \* \* \* \*